United States Patent [19]
Hamilton

[11] 3,847,298
[45] Nov. 12, 1974

[54] FUEL TANK INERTING SYSTEM

[75] Inventor: Mackenzie L. Hamilton, Los Angeles, Calif.

[73] Assignee: The Garrett Corporation, Los Angeles, Calif.

[22] Filed: Mar. 20, 1972

[21] Appl. No.: 235,955

[52] U.S. Cl. .............. 220/88 B, 252/372, 23/281, 137/209
[51] Int. Cl. ............................................ B65d 25/00
[58] Field of Search .............. 220/88 B; 244/135 R; 60/300, 39.48, 39.66; 62/87; 169/4; 252/372; 23/281

[56] References Cited
UNITED STATES PATENTS

| | | | |
|---|---|---|---|
| 1,789,812 | 1/1931 | Frazer | 60/300 |
| 2,365,624 | 12/1944 | Cantello et al. | 220/88 B |
| 2,413,225 | 12/1946 | Griffith | 60/39.66 |
| 2,756,215 | 7/1956 | Burgess et al. | 244/135 R |
| 2,898,202 | 8/1959 | Houdry et al. | 60/300 |
| 2,944,987 | 7/1960 | Potter et al. | 252/372 |
| 2,966,036 | 12/1960 | Stowens | 62/87 |
| 3,103,296 | 9/1963 | Gour | 220/88 B |
| 3,389,829 | 6/1968 | Stanford | 252/372 |
| 3,389,972 | 6/1968 | Pottharst, Jr. | 252/372 |
| 3,464,801 | 9/1969 | Barstow | 252/372 |

Primary Examiner—Samuel Feinberg
Attorney, Agent, or Firm—Albert J. Miller

[57] ABSTRACT

An inert gas to inert the fuel tanks of an aircraft or the like is produced from the reaction between fuel and bleed or ram air. The reaction gases are then cooled before being provided to the fuel tank to be inerted.

8 Claims, 23 Drawing Figures

FUEL TANK INERTING SYSTEM

BACKGROUND OF THE INVENTION

It has long been desired to provide means to safely store and utilize the fuel required in the propulsion and operation of airborne vehicles such as aircraft and helicopters. Without appropriate precautions, the accumulation and formation of explosive mixtures in the fuel tanks of such vehicles can easily be obtained. when an explosive fuel/air mixture has been formed, it is clearly recognized as a very dangerous condition, for such a mixture can be easily ignited from internally caused static electricity, a chance spark, etc. The problem is compounded with respect to military aircraft in that the explosive mixtures may be set off by an incendiary projectile or fragment entering the fuel tank area.

It has been known to provide an inert gas such as carbon dioxide or nitrogen to dilute the vapors in an aircraft fuel tank sufficiently to render them nonexplosive. The greatest disadvantages of using a relatively pure nitrogen or carbon dioxide as an inert gas is the great bulk and weight of the storage containers which would be required to carry sufficient amounts of this inerting fluid. Both weight and space are at a premium in aircraft and this is even more particularly so in military aircraft. In addition carbon dioxide has a comparatively high solubility in most aircraft fuels with the result that vapor lock, engine surging and engine roughness can be caused under certain operating conditions.

The utilization of engine exhaust gas as an inerting fluid, while it does not require storage facilities, presents other disadvantages. Since the exhaust gas from both jet engines and reciprocating engines contains a large amount of water vapor, this water vapor can condense and freeze in the fuel tank vents and in the internal wing structures. Also this water vapor may condense in the fuel itself causing filter clog and poor engine performance. These particular difficulties cannot be completely avoided by the use of condensers or similar devices. In addition, the exhaust gas will also contain the corrosive products of partial combustion and in many instances may contain harmful halogen compounds.

Further, the withdrawal of an engine exhaust having a comparatively uniform composition from a reciprocating engine is relatively complex and the problem is compounded in the case of jet engines. Instability of the flame front and displacement of the combustion zone under the varing operating conditions, result in wide variations in the composition of the exhaust gas, particularly with regard to the oxygen content. In extreme cases, it is not inconceivable that essentially pure air would be withdrawn as the potential inerting gas.

SUMMARY OF THE INVENTION

The present invention utiliizes a fuel tank inerting gas produced from the reaction of fuel with either bleed air from the aircraft propulsion engines or ram air available from the exterior of the moving aircraft. In one embodiment the fuel and bleed air are catalytically reacted to produce reaction gases which are then cooled by either simple cycle or bootstrap cycle cooling systems in which at least part of the cooling is obtained from expansion across a cooling turbine. Moisture can be removed from the cooled reaction gases as required. In addition, vapor cycle refrigeration systems can be utilized but in each case ram air drawn from outside the aircraft is utilized as the primary cooling sink. The catalytic reactor may encompass any number of heat transfer configurations and cooling schemes. In addition, the catalytic reactor may be integrated with the environmental control system for the aircraft.

Alternately, the bleed air and fuel may be reacted in a combustor to produce the reaction gases for fuel tank inerting or a bootstrap combustor/reactor system can be utilized.

DESCRIPTION OF THE PREFERRED EMBODIMEMTS

Figure 1:
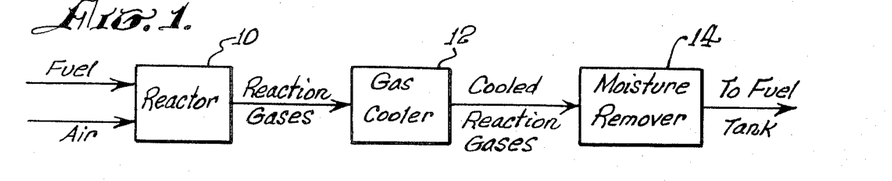
FIG. 1 is a schematic block diagram of the basic fuel tank inerting system of the present invention.

As illustrated in FIG. 1, the basic fuel tank inerting system comprises a reactor 10 which produces gases from the reaction between fuel and air. The reactor 10 substantially removes all oxygen from the air during this reaction. Before the oxygen depleted reaction gases can be provided to the fuel tank, they must be cooled in the gas cooler 12 and also have substantially all water vapor removed therefrom in the moisture remover 14.

Figure 2:
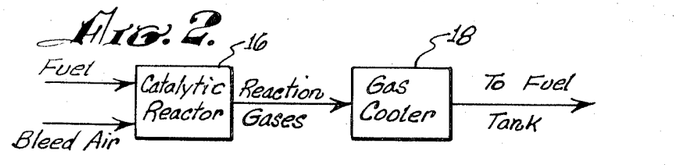
FIG. 2 is a schematic block diagram of the basic catalytic reactor fuel tank inerting system.

In one embodiment the reactor 10 may comprise a catalytic reactor 16 in which fuel and bleed air from the aircraft propulsion engines are reacted to produce oxygen depleted reaction gases with are then cooled in the gas cooler 18 before being provided to the fuel tank.

Moisture removal will be inherently provided in many of the gas cooling systems.

It has already been established that a catalytic reaction of air and fuel is a practical method of obtaining an inert gas, that is, a gas substantially depleted of oxygen. For example, a metal oxide catalyst from American Cyanamid Company designated by them as "Code A catalyst" will effectively cause reaction of a fuel/air mixture at a reaction light-off temperature of 500°/600°F. Should bleed air not be available at the required light-off temperature, a start-up combustor can be used to obtain light-off. In addition, American Cyanamid "Code A catalyst" may be combined with platinum or palladium or alternately platinum or palladium could be combined with a Grace 908 catalyst. Precious metal catalysts such as palladium and platinum have light-off temperatures below that which is normally available from bleed air. In addition to the precious metal catalysts, other metal oxide catalysts in addition to American Cyanamid Code A can provide the required catalytic reaction.

Since the catalytic reaction is an exothermic reaction, dissipation of the heat energy released thereby is required. The available heat sinks for this heat rejection would be the ram air available from outside the aircraft, aircraft engine fuel before it is consumed, chilled air from the aircraft environmental conditioning system and water. Ram air would be the most readily available heat sink.

As will be discussed later, this gas cooling can be accomplished either by direct cooling by heat rejection to the heat sinks or by a number of various refrigeration cycles.

Figure 3:
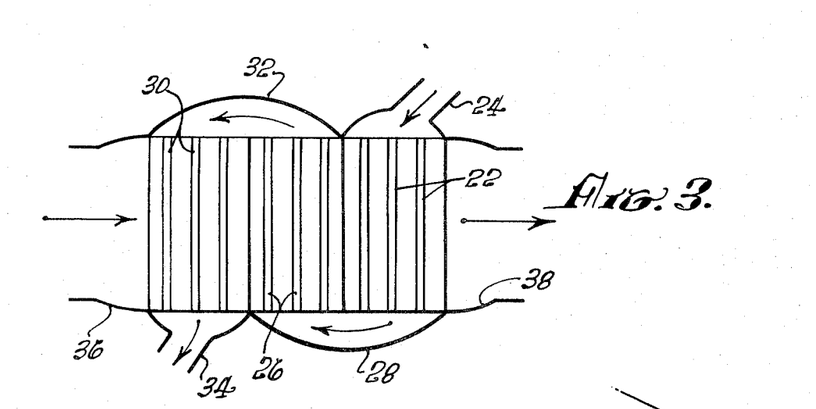
FIG. 3 is a schematic diagram of a multiple pass, tubular, cross flow heat exchanger/catalytic reactor.

As a practical matter, the catalytic reactor can be effectively combined with a heat exchanger to provide the initial cooling of the catalytic reactor reaction gases. As illustrated in FIG. 3 a multibank tube type heat exchanger can be utilized. A first bank of reactor tubes 22 receive a mixture of bleed air and fuel from reactor inlet 24. After passing through this first bank of tubes 22, the bleed air/fuel mixture is directed through a second bank of reactor tubes 26 by manifold 28 and then through a third bank of tubes 30 by manifold 32 before the reaction products are passed from the reactor through reactor outlet 34. Cooling air is directed across the banks 30, 26 and 22 respectively from the cooling air inlet 36 and then exhausted through cooling air outlet 38.

Figure 4:
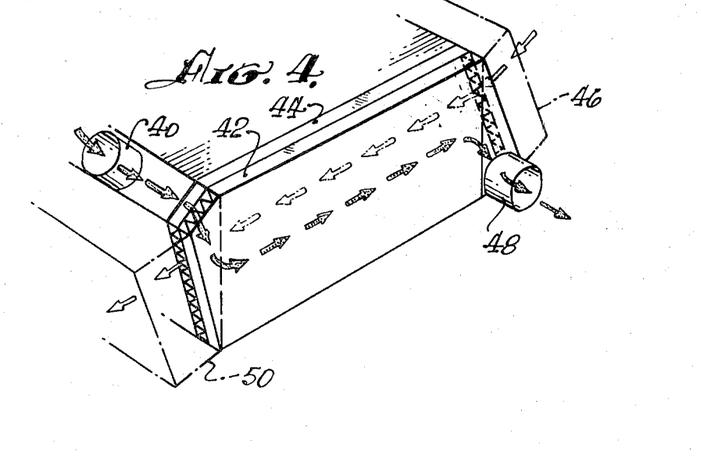
FIG. 4 is a schematic diagram of a single pass, plate fin, parallel counterflow heat exchanger/catalytic reactor.

In FIG. 4 a single pass, plate fin, parallel counterflow heat exchanger/catalytic reactor is illustrated. The bleed air/fuel mixture from inlet 40 is directed through passages 42 which alternate with passages 44 having cooling air from cooling air inlet 46. The inert gas outlet 48 receives the flow from the passages 42 while cooling air outlet 50 receives the flow from passages 44.

Figure 5:
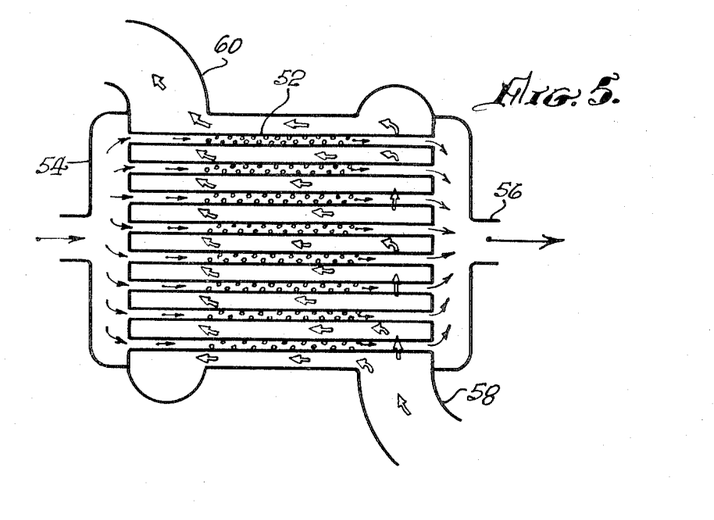
FIG. 5 is a schematic diagram of a parallel, counterflow, tubular heat exchanger/catalytic reactor.

In FIG. 5, there is illustrated a parallel, counterflow, tubular heat exchanger/catalytic reactor. The bleed air/fuel mixture is directed through a plurality of reactor tubes 52 by inlet manifold 54 before passing out through outlet manifold 56. Each of the tubes include a bed of catalytic material to produce the desired reaction. The cooling air from inlet 58 is directed across the tubes 52 is essentially a counterflow relationship before passing out through outlet 60.

Figure 6:
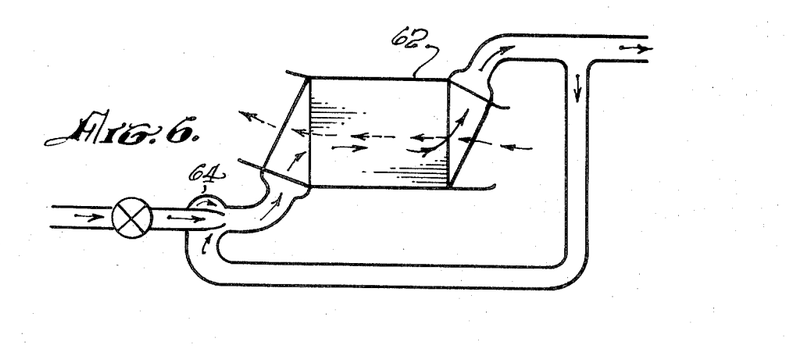
FIG. 6 is a schematic diagram of a parallel, counterflow, plate fin heat exchanger/catalytic reactor having ejector through flow multiplication.

A parallel, counterflow, plate fin heat exchanger/catalytic reactor with ejector through flow multiplication is illustrated in FIG. 6. The reactor 62 may be as shown in FIG. 4. An increase in the reactor through flow may be accomplished by recirculation of a portion of the reactor output by ejector action of the jet pump 64.

Figure 7:
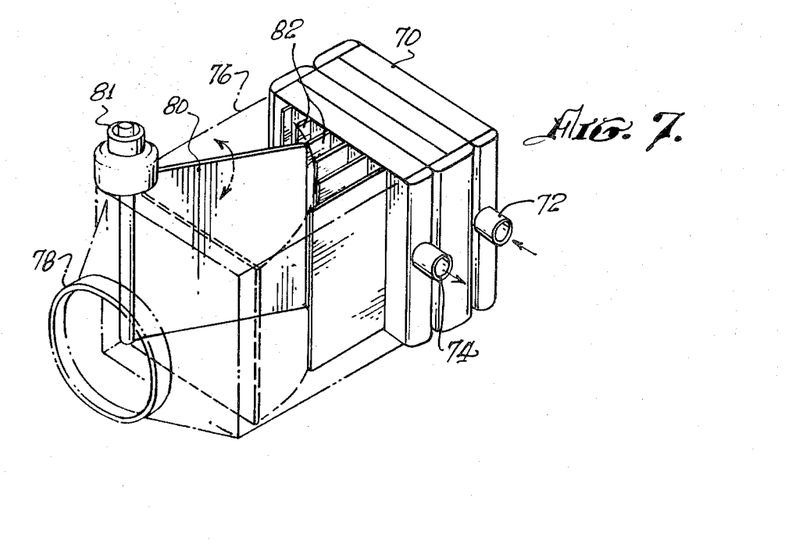
FIG. 7 is a schematic catalytic reactor structural configuration.

One structural embodiment of the catalytic reactor configuration of the multi-pass arrangement illustrated in FIG. 3 is shown in Fig. 7. The catalytic reactor 70 having bleed air/fuel mixture inlet 72 and inert gas outlet 74 is provided at one end of a housing 76 with a ram air inlet 78 at the opposite end thereof. A ram air door 80 is pivotably mounted along one ram air inlet edge of the housing 76 to pivotably swing into the housing 76. A plurality of flow splitters 82 extend from the reactor 70 to clear the path of the pivoting ram air door 80 to direct the flow of ram air through the catalytic reactor 70. Partial opening of the ram air door 80 in response to the ram air door actuator 81 in conjunction with the flow splitters 82 enables the regulation of the ram air flow to provide flow through only a portion of the reactor 70 when only a low inert flow is required.

Figure 8:
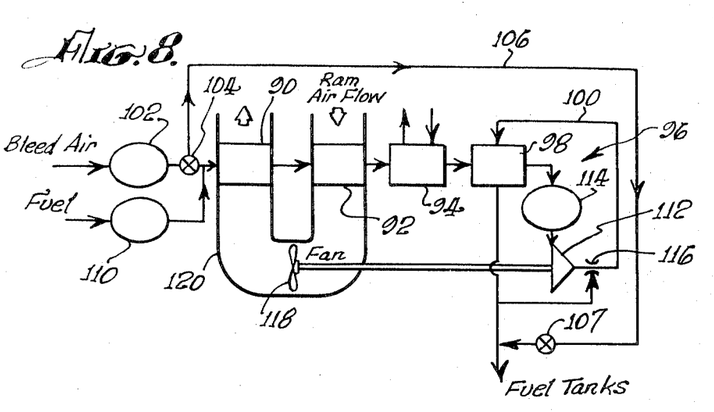
FIG. 8 is a simplified schematic inert gas fuel tank inerting system.

The basic fuel tank inerting system is illustrated schematically in FIG. 8. In general the system comprises a ram air cooled catalytic reactor 90 supplying inert flow to one or more precoolers 92 and 94 followed by a simple air cooling cycle 96 which includes a regenerator 98 with a recirculation loop 100. The bleed air is provided to the catalytic reactor 90 through pressure and flow sensing means 102 and bypass valve 104. The bypass valve 104 may divert a portion of the bleed air directly to the fuel tank through bypass line 106 which includes bypass line valve 107. The fuel is provided to the catalytic reactor 90 through pressure and flow control means 110. The reaction products from the catalytic reactor 90 are passed to the ram air precooler 92 which initially receives the ram air before it is passed through the catalytic reactor 90. A precooler 94 cooled by engine fuel can be provided for use during high speed flight when ram air alone may not be sufficient to provide adequate cooling. The inert gas flow then passes through the regenerator 98 which uses the cooled inert gas discharged from the cooling turbine 112 as its heat sink. From the regenerator 98 the inert gas passes through the cooling turbine 112 having flow control 114 and then passes through the other side of the regenerator 98 before being distributed to the fuel tanks. The cooling turbine 112 may drive a fan 118 in the ram air duct 120 between the precooler 92 and catalytic reactor 90 to enhance the flow of ram air therebetween. The performance of the regenerator 98 is enhanced by the jet pump 116 on the turbine discharge flow to recirculate a portion of the inert gas from the regenerator 98. This increases the cooled maximum flow in the regenerator, thus improving its overall performance in eliminating the possibility of freezing of the turbine discharge. No specific water removal is required other than that which is inherent in the simple air cycle cooling.

Figure 9:
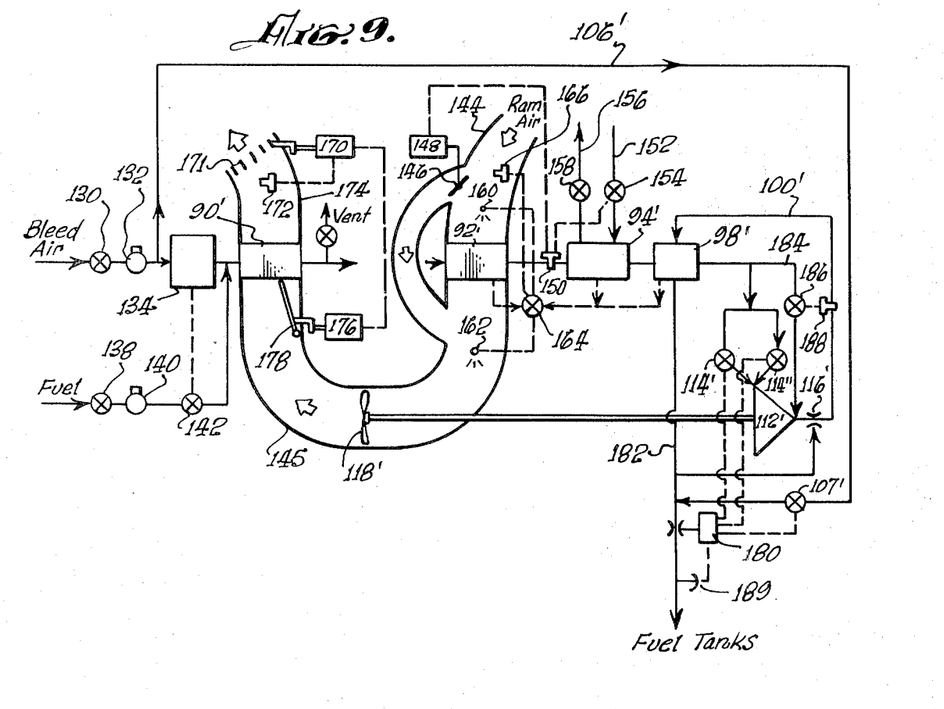
FIG. 9 is a more detailed schematic inert gas fuel tank inerting system.

A more detailed schematic of the fuel tank inerting system is shown in FIG. 9 and more clearly illustrates the functional operation of the system. The catalytic reactor 90' is provided with bleed air through an air shut-off valve 130, air pressure regulator 132 and airflow mass sensor 134. The bypass line 106' may bypass bleed air from between the air pressure regulator 132 and the air flow maximum sensor 134 directly to the fuel tanks through a bypass valve 107'. The fuel is provided to the catalytic reactor 90' through fuel shut-off valve 138, fuel pressure regulator 140 and fuel flow control valve 142 which is operably connected to the air flow mass sensor 134. The catalytic reactor 90' provides its inert reaction products to the ram air cooler 92' which is cooled by ram air from ram air intake 144. A ram bypass valve 146 controlled by ram bypass actuator 148 may direct a portion of the ram air around the inert/ram air precooler 92' in response to a signal from a temperature indicator 150 at the outlet of the ram air precooler 92'. After the temperature is sensed by sensor 150, the inert gases are passed through the fuel precooler 94'. The fuel inlet 152 to the precooler 94' includes valve 154 which is also controlled by temperature sensor 150. The fuel outlet 156 from precooler 94' likewise includes valve 158. The cooled inert gas from precooler 94 is then fed to the regenerator 98'.

Any condensed water from the ram air precooler 92', the fuel precooler 94' and/or the regenerator 98' is collected and directed into the ram air intake 144 by means of a sprinkler 160 located in the ram air intake 144 or a sprinkler 162 located on the downstream side of the ram air precooler 92'. The distribution of this condensed water to either sprinklers 160 or 162 is controlled by a water control valve 164 which receives a signal from a temperature sensor 166 in the ram air intake 144. The flow of air through the ram air duct 145 between the ram air precooler 92' and the reactor 90' is controlled by a pivoting door 178 and also by a ram door 171 in the ram air outlet 174. Ram doors 178 and 171 are controlled by actuators 176 and 179 respectively which receive a signal from a temperature sensor 172 in the ram air outlet 174.

The inert gas from the regenerator 98' is directed to the cooling turbine 112' through turbine nozzle valves 114' and 114"both of which are controlled by an inlet flow control sensor 180 in the line 182 from the regenerator 98' to the fuel tanks. Also, a bypass line 184 including valve 186 can be used to bypass inert gas from the regenerator 98' past the cooling turbine 112'. A temperature sensor 188 in the regenerator line 100' from the cooling turbine 112' to the regenerator 98' controls the turbine bypass valve 186. The jet pump 116' in the regenerator line 100' draws off fluid from the regenerator outlet line 182. The inlet flow control sensor 180 also provides a signal to the bypass valve 107' and to an excess flow relief valve 189 in the line 182.

The dual nozzle cooling turbine provides a high turbine efficiency over a large range of turbine through flows. To enhance the cooling capacity of the regenerator and to eliminate freezing at the turbine discharge line, a portion of the regenerator's discharge flow is mixed with the turbine discharge in the jet pump located on the turbine. This increases the cooled side maximum flow of the regenerator and improves its overall performance.

Figure 10:
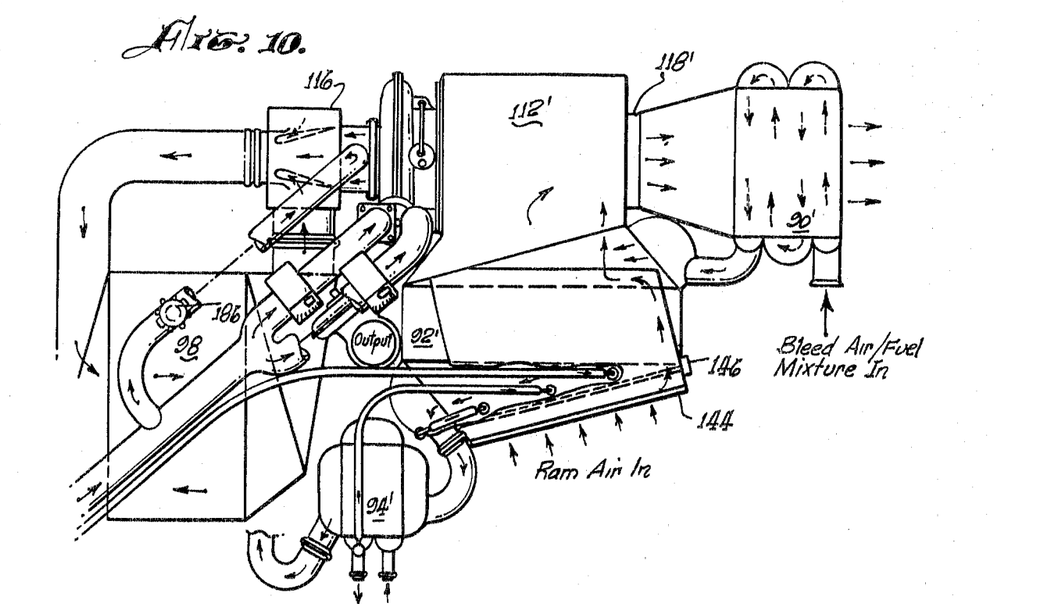
FIG. 10 is a packaging configuration of the inert gas fuel tank inerting system schematic of FIG. 9.

The packaging of the inert gas system schematic illustrated in FiG. 9 can be accomplished as shown in FIG. 10 with the same elements indicated by identical numeral designations.

Figures 11, 12, 13:
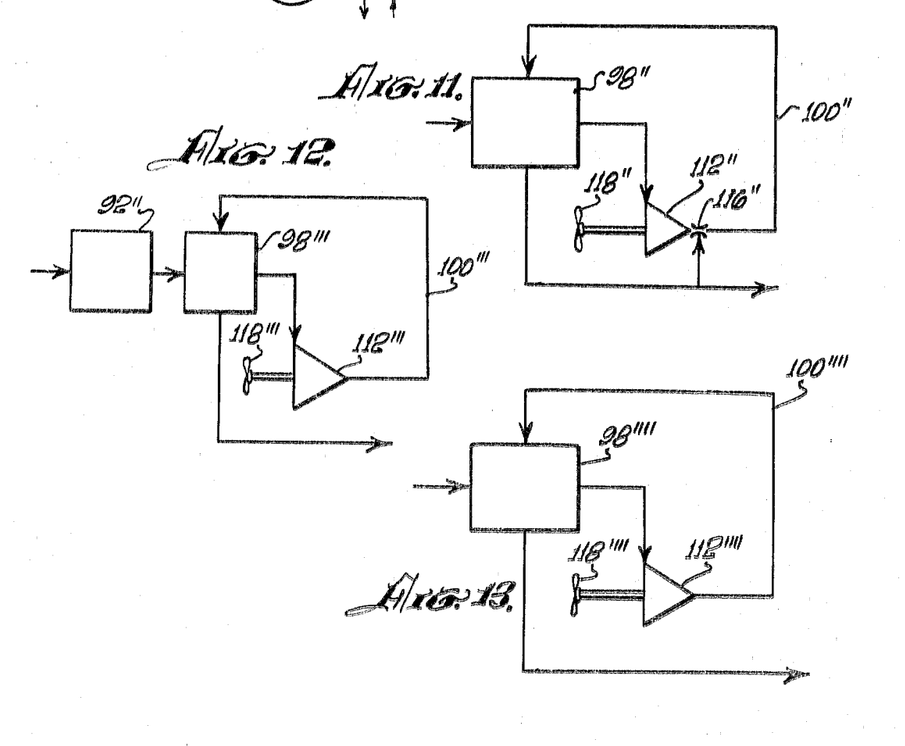
FIGS. 11–13 are schematic block diagrams of alternate simple cycle cooling systems useful in the fuel tank inerting system schematic of FIG. 8.

While a simple cycle cooling system having a precooler and regenerator with a recirculation loop has been shown in the schematic inert gas system schematically illustrated in FIG. 9, alternate simple cycle cooling concepts can be utilized. For example, a simple cycle cooling system without the precooler could be utilized as shown in FIG. 11 or a simple cycle cooling system without recirculation is feasible, with the precooler as shown in FIGS. 12 or without the precooler as shown in FIG. 13.

Figure 14:
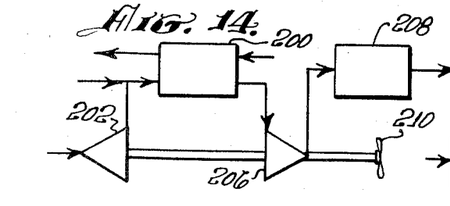
FIGS. 14–19 are schematic diagrams of bootstrap cycle cooling systems useful in the fuel tank inerting system schematic of FIG. 8.
Figure 15:
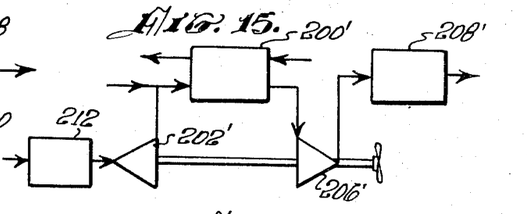
Figure 16:
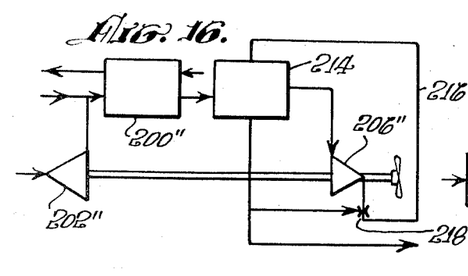
Figure 17:
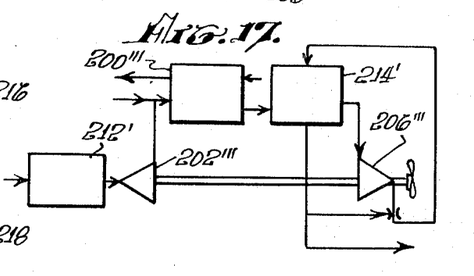

In addition, a number of bootstrap cycle cooling systems can be utilized as illustrated in FIGS. 14 through 19. FIG. 14 represents a bootstrap cycle concept in which a catalytic reactor 200 receives the compressed air from compressor 202 in addition to fuel to produce an inert gas which is discharged to a turbine 206 on a common shaft with the compressor 202. The discharge from the turbine 206 is then passed through a water separator 208 before being utilized. The turbine 206 may also drive a fan 210 which can be used to supplement ram air passed through the heat exchanger 200. In FIG. 15 precooler 212 is added before the compressor 202'. In FIG. 16 a regenerator 214 in a recirculation loop 216 driven by a jet pump 218 has been added. The concept illustrated in FIG. 17 adds the precooler 212 to the concept illustrated in FIG. 16.

Figure 18:
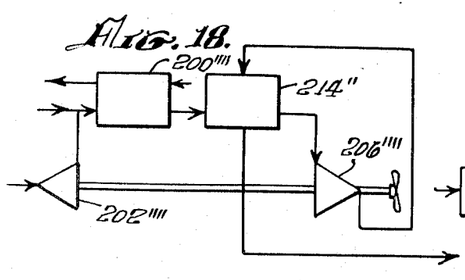
Figure 19:
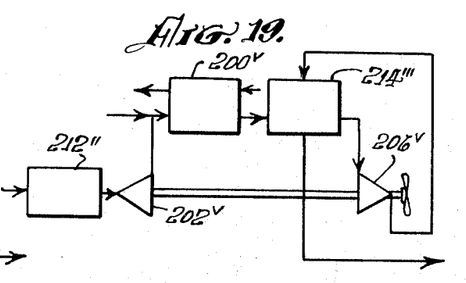
Figure 20:
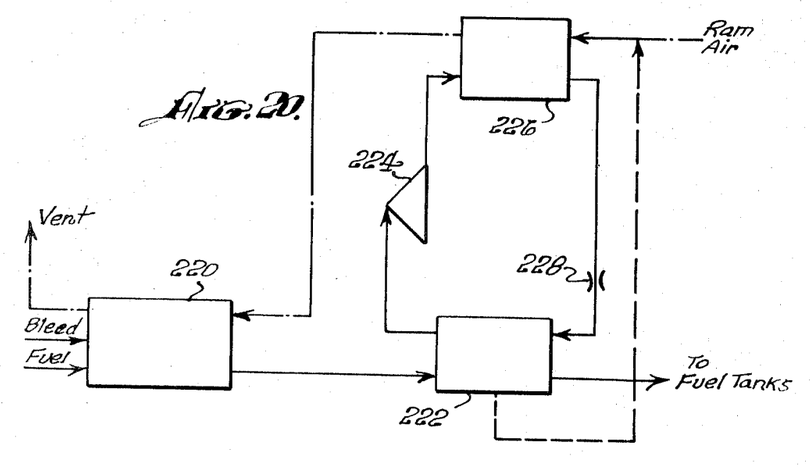
FIG. 20 is a schematic block diagram of a vapor cycle refrigeration system/catalytic reactor fuel tank inerting system.

The concept illustrated in FIG. 18 shows a regenerator 214" without the recirculation loop, while the concept of FIG. 19 includes both the regenerator 214" without the circulation loop in addition to precooler 212" before the compressor 202$^v$.

while both simple cycle and bootstrap cycle cooling concepts have been illustrated, is is also possible to use a vapor cycle refrigeration system as illustrated in FIG. 20. In this system the catalytic reactor 220 receives bleed air and fuel to produce an inert gas which is passed to a freon evaporator 222 before being directed to the fuel tanks. The freon evaporator is cooled by a conventional refrigeration system including compressor 224, freon condenser 226 and expansion valve 228. Ram air may be used to cool the freon condenser 226 and catalytic reactor 220. As illustrated, any condensed water from the freon evaporator 222 may be introduced into the ram air before it is used to cool the freon condenser 226.

Figure 21:
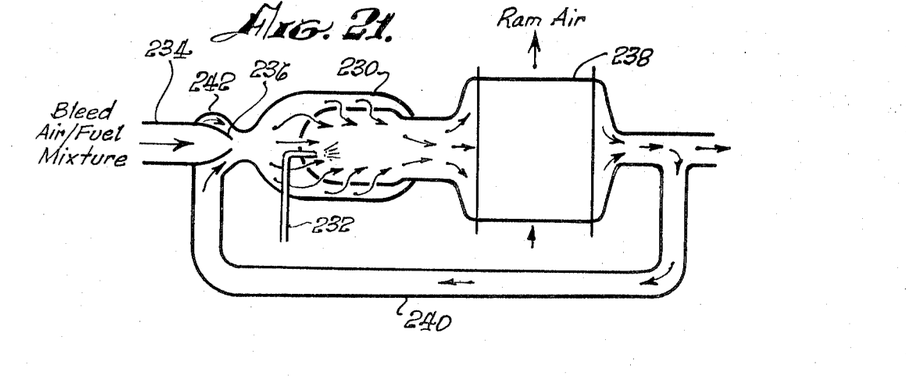
FIG. 21 is a combustion type fuel tank inerting system with ejector through flow multiplication.

While the production of inert gas has been principally described as being produced by the catalytic reaction of bleed air and fuel, it is also possible to produce inert gas by the combustion of a bleed air/fuel mixture. and, in some cases, may be extremely advantageous. A system utilizing the combustion of bleed air and fuel in a combustor is illustrated in FIG. 21. The combustor 230 which includes igniter 232 receives a bleed air/fuel mixture from inlet 234 having nozzle restriction 236. The inert combustion products are passed through cooling heat exchanger 238, which may be cooled by ram air, before being provided to the fuel tanks. An inert recycle loop 240 may direct part of the cooled inert combustion gases back through the combustor 230 by means of jet pump 242 around inlet nozzle 236.

Figure 22:
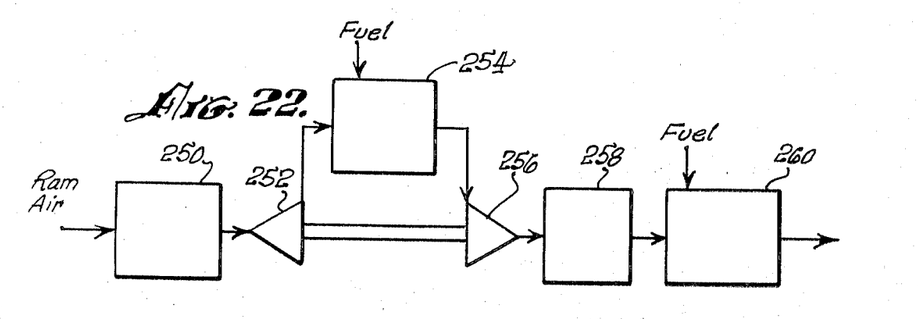
FIG. 22 is a schematic diagram of a bootstrap combustor/reactor fuel tank inerting system.

Further, it is possible to provide a inert gas source operable on ram air during all flight modes except very low speed flight at high altitudes. As illustrated in FIG. 22, ram air, which may be precooled in precooler 250, is compressed in compressor 252 before being heated in combustor or reactor 254 to produce the inert gases which are expanded through turbine 256. The expanded gases from turbine 256 are then cooled in heat exchanger 258 before again being heated in the combustor or reactor 260.

Figure 23:
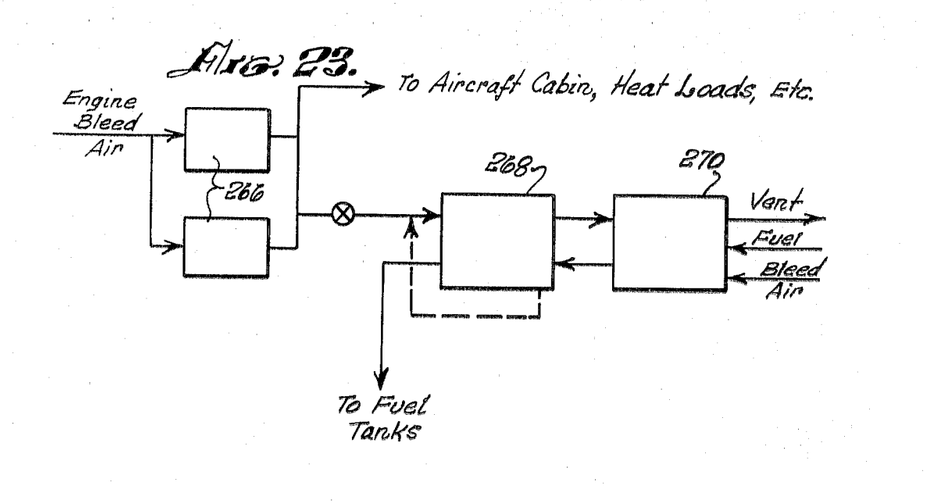
FIG. 23 is a schematic diagram of a fuel tank inerting system integrated with the aircraft environmental control system.

In another embodiment as illustrated in FIG. 23, chilled air from the aircraft environmental control system may be taken from the environmental control system cooling packs 266 and used in heat exchanger 268 to cool the inert reaction products from catalytic reactor 270 before these inert products are provided to the fuel tanks. Any condensed water from the heat exchanger can be introduced into the chilled air upstream of the heat exchanger 268. In this embodiment the requirement for ram air and its associated ducting is not required and thus the inerting system can be located in the aircraft without regard to ram air availability.

In operation the fuel tank inerting system must provide several function modes to fit various parameters in the aircraft operating engine. During the normal mode it would be used during all flight conditions except climb and emergency descent and would be set to provide inert flow to maintain the fuel tanks at some specified pressure slightly above atmospheric pressure. The tank pressure is controlled by tank valving which typically allows a band of several PSI difference between the tank and ambient before venting or inflow occurs. Changes in tank temperature and tank pressure relative to ambient will require (1) venting of excess pressure when ullage gases expand and (2) the addition of inert gas as the ullage contracts. During climb the input of inert gases to the tank is set to maintain the tank atmospheric oxygen concentration within specified limits as dissolved oxygen in the fuel out gases. Tank pressure is controlled by tank venting from the tank atmosphere to ambient as required.

During emergency descent, the required inflow of inert gas to maintain pressurization is increased substantially and this additional flow may be obtained by adding bleed air directly to the inert system output. While the oxygen content of the inert gases is raised, it will remain within acceptable limits while providing the required flow. When the aircraft is on the ground, the inerting system may be operated provided that the necessary supplies of bleed air and power are available.

While specific embodiments of the invention have been illustrated and described, it is to be understood that these embodiments are provided by way of example only and that the invention is not to be construed as being limited thereto, but only by the proper scope of the following claims.

What I claim is:

1. An inerting system for a fuel tank of a movable vehicle driven by a propulsion engine comprising:
    a first heat exchanger having, a catalytic reactor hot side to catalytically react fuel from the tank with heated bleed air from the vehicular propulsion engine to produce oxygen-depleted reaction gases, and a ram air cooled cold side;
    a second heat exchanger having a hot side to receive reaction gases from the catalytic reactor hot side of said first heat exchanger and a cold side to receive ram air from the fluid stream moving past the vehicle;
    means to transfer ram air from the cold side of said second heat exchanger to the cold side of said first heat exchanger;
    a third heat exchanger to receive reaction gases from said second heat exchanger, said third heat exchanger cooled by a portion of the fuel from the vehicular fuel tank;
    a fourth heat exchanger having a hot side to receive reaction gases from said third heat exchanger;
    a cooling turbine to receive reaction gases from the hot side of said fourth heat exchanger and to expand the reaction gases therethrough, said fourth heat exchanger having a cold side to receive the expanded reaction gases from said cooling turbine before the reaction gases are provided to the fuel tank; and
    reaction gases pumping means disposed between said cooling turbine and the cold side of said fourth heat exchanger to receive and recirculate a portion of the reaction gases from the cold side of said fourth heat exchanger with the expanded reaction gases from said cooling turbine.

2. The fuel tank inerting system of claim 1 and in addition fan means disposed in the ram air transfer means between the cold side of the said second heat exchanger and the cold side of said first heat exchanger, said fan means operably connected to and driven by said cooling turbine.

3. The fuel tank inerting system of claim 2 and in addition means to bypass ram air around the cold side of said second heat exchanger.

4. The fuel tank inerting system of claim 2 and in addition means to collect moisture condensate from said second, third, and fourth heat exchangers and to transfer the moisture condensate into the ram air to cool the first and second heat exchangers.

5. A fuel tank inerting system of claim 2 and in addition means to bypass at least a portion of the reaction gases from the hot side of said fourth heat exchanger around said cooling turbine.

6. An inerting system for a fuel tank of a movable vehicle driven by a propulsion engine comprising:
    a first heat exchanger to receive and cool ram air from the fluid stream moving past the vehicle;
    a compressor to receive and compress the cooled ram air from said first heat exchanger;
    means to react a portion of the fuel from the fuel tank with the cooled ram air from said compressor to produce reaction gases;
    a cooling turbine to receive the reaction gases from said reacting means to expand the reaction gases therethrough, sid turbine operably connected to said compressor;
    a second heat exchanger to receive the reaction gases from said cooling turbine; and
    means to react a portion of the fuel from the fuel tank with the reaction gases from said second heat exchanger to produce oxygendepleted reaction gases as ullage from the fuel tank, 7. The fuel tank inerting system of claim 6 wherein said reacting means are catalytic reactors.

8. An inerting system for an aircraft fuel tank, the aircraft including an environmental control system to provide chilled air, said inerting system comprising:
    a heat exchanger having a cold side to receive chilled air from the aircraft environmental control system to heat the chilled air; and
    a catalytic reactor to receive the heated air from the heat exchanger and a portion of the fuel from the fuel tank to react the air and fuel to produce oxygen-depleted reaction gases;
    the hot side of said heat exchanger receiving the oxygendepleted gases from said catalytic reactor to cool the reaction gases before the gases as provided as ullage to the fuel tank.

* * * * *